UNITED STATES PATENT OFFICE.

ROBERT TERN, OF SCHWARTAU, NEAR LÜBECK, GERMANY.

PROCESS OF CONSERVING FISH-MEAT.

999,274.   Specification of Letters Patent.   Patented Aug. 1, 1911.

No Drawing.   Application filed March 21, 1911. Serial No. 615,921.

*To all whom it may concern:*

Be it known that I, ROBERT TERN, a subject of the Emperor of Germany, residing at 19 Lübeckerstrasse, Schwartau, near Lübeck, Germany, have invented certain new and useful Improvements in Processes of Conserving Fish-Meat, of which the following is a specification.

The present invention is a process of conserving fish-meat of such fishes, as, because of the oily taste of their meat are not commonly used, such as ray, sea-salmon, cod-fish, etc.

The object of the invention is to remove or destroy the oily and fishy taste from the meat of these fishes. This is accomplished by boiling it until it is done in water to which acetic acid and a liquor made from spices soaked in spirit of wine has been added, to conserve it thereby, and to provide by this process a fish-meat which, in adding suitable flavoring ingredients becomes a palatable food and relish, which will remain eatable for a long period of time.

High-sea fish, such as ray, sea-salmon, cod-fish, etc., contain great quantities of train-oil whereby the meat of the same often becomes rancid and ill smelling. To conserve this meat therefore, and also to make it eatable it is necesary to abstract the train-oil from the fish. This is done in the following manner:—The fishes are cleaned and put in a vessel and boiled with water to which has been added for each pound of fish meat 1 gram of acetic acid and also 5 grams of a liquor made of a mixture, preferably of 1 part each of ground cinnamon, ginger, cardamom and crushed laurel-leaves, cloves, oranges and chopped onions, which are soaked about 8 days under 15° C. in 5 parts of spirit of wine and the liquor then clarified. The flavor of oil in the fish is totally destroyed by the acid and the spiced liquor takes away the fishy taste and prevents the meat from becoming rancid. The meat prepared and treated by the above process does not loose any of its nutritious qualities. After the fishes have been boiled, the skin is taken off, the bones taken out and the meat is dried by heat. The dried meat is then pulverized and preferably mixed with dried, pulverized bread and chopped boiled potatoes. This mass is now seasoned with salt, pepper, onions, etc., and formed into cakes and fried.

What I claim and desire to secure is:—

1. The herein described process of conserving fish-meat consisting in putting the cleaned fish in a vessel with water to which has been added for each pound of fish: 1 gram of acetic acid and 5 grams of a clarified liquor made of water and a mixture preferably of 1 part each of ground cinnamon, ginger, cardamom, crushed laurel-leaves, cloves, oranges and chopped onions which have been soaked about 8 days under 15° C. in 5 parts of spirit of wine, and in this liquor and the acetic acid and water boiling the meat until well done, removing the skin and bones, drying by heat, and grinding the resulting product.

2. The herein described process of conserving fish-meat by putting the cleaned fish-meat in a vessel with water to which has been added for each pound of the meat 1 gram of acetic acid, and 5 grams of a flavoring and preserving liquor, boiling until well done, removing the skin and bones, drying, and reducing to powder.

In testimony whereof I affix my signature in the presence of two witnesses.

ROBERT TERN.

Witnesses:
  WILHELM GRAEFE,
  JOHS WALT.